(12) United States Patent
Klingbeil et al.

(10) Patent No.: US 10,316,783 B2
(45) Date of Patent: Jun. 11, 2019

(54) FUEL INJECTOR WEAR CORRECTION METHODOLOGY

(71) Applicant: GENERAL ELECTRIC COMPANY, Schenectady, NY (US)

(72) Inventors: Adam Edgar Klingbeil, Ballston Lake, NY (US); Thomas Michael Lavertu, Clifton Park, NY (US); James Robert Mischler, Girard, PA (US)

(73) Assignee: GE Global Sourcing LLC, Norwalk, CT (US)

( * ) Notice: Subject to any disclaimer, the term of this patent is extended or adjusted under 35 U.S.C. 154(b) by 316 days.

(21) Appl. No.: 14/708,920

(22) Filed: May 11, 2015

(65) Prior Publication Data

US 2016/0333811 A1    Nov. 17, 2016

(51) Int. Cl.
*F02D 41/24* (2006.01)
*F02D 41/14* (2006.01)
(Continued)

(52) U.S. Cl.
CPC ..... *F02D 41/2467* (2013.01); *F02D 41/1456* (2013.01); *F02D 41/1497* (2013.01);
(Continued)

(58) Field of Classification Search
CPC .... F02D 41/2467; F02D 41/18; F02D 41/221; F02D 41/1456; F02D 2041/1433; F02D 2200/0614
See application file for complete search history.

(56) References Cited

U.S. PATENT DOCUMENTS

| 4,438,496 A | 3/1984 | Ohie |
| 5,195,482 A * | 3/1993 | Smith .................... F02M 53/04 123/198 A |

(Continued)

FOREIGN PATENT DOCUMENTS

| JP | 2008202461 A | * | 9/2008 | |
| JP | 2008309086 A | * | 12/2008 | ........... F02D 35/023 |

OTHER PUBLICATIONS

G. Roth, "Correlation of Fuel Filtration Levels to Fuel Injector Wear and Performance Shifts," SAE The Engineering Society for Advancing Mobility Land Sea Air and Space International, International Congress and Exposition, Mar. 1-5, 1993, Paper No: 930021, 13 pages.

(Continued)

*Primary Examiner* — Joseph J Dallo
(74) *Attorney, Agent, or Firm* — McCoy Russell LLP (57) ABSTRACT

Fuel injector wear methodologies for use with internal combustion engines include a method that determines power of the engine and/or fuel flow of a fuel injector(s) associated with a cylinder the engine; obtains a duration of a fuel injection event from the injector(s) associated with the cylinder(s) of the engine; compares the power, the fuel flow, and/or the duration with a reference value; and then adjusts the fuel injection timing of the fuel injector(s), based on the comparison. Another method adjusts operation of an engine includes: comparing two (or more) engine models, wherein one model is related to a fuel injection event duration of the engine or a modeled fuel quantity being supplied to the engine and then adjusting the fuel injection timing of a fuel injector(s) of the engine, based on the comparison.

28 Claims, 6 Drawing Sheets

(51) Int. Cl.
*F02D 41/18* (2006.01)
*F02D 41/22* (2006.01)
*F02D 41/40* (2006.01)
*F02M 65/00* (2006.01)
*F02B 37/22* (2006.01)
*F02D 41/00* (2006.01)

(52) U.S. Cl.
CPC .......... *F02D 41/18* (2013.01); *F02D 41/221* (2013.01); *F02D 41/401* (2013.01); *F02B 37/22* (2013.01); *F02D 41/005* (2013.01); *F02D 41/0007* (2013.01); *F02D 2041/1433* (2013.01); *F02D 2200/0614* (2013.01); *F02M 65/001* (2013.01); *Y02T 10/44* (2013.01)

(56) References Cited

U.S. PATENT DOCUMENTS

| | | | |
|---|---|---|---|
| 5,611,317 A | 3/1997 | Peters et al. | |
| 5,755,207 A * | 5/1998 | Kushibe | F02D 41/3005 123/294 |
| 5,934,249 A * | 8/1999 | Nanba | F02D 41/0052 123/350 |
| 6,026,786 A | 2/2000 | Groff et al. | |
| 6,123,910 A * | 9/2000 | Yoshii | B01D 53/346 423/235 |
| 6,286,479 B1 | 9/2001 | Cryer et al. | |
| 6,321,723 B1 | 11/2001 | Merkle et al. | |
| 6,493,627 B1 | 12/2002 | Gallagher et al. | |
| 6,988,490 B2 * | 1/2006 | Satou | F02B 23/104 123/299 |
| 7,152,575 B2 | 12/2006 | Fritsch et al. | |
| 7,178,492 B2 | 2/2007 | Coleman et al. | |
| 7,228,250 B2 * | 6/2007 | Naiman | G06Q 50/02 208/213 |
| 7,370,521 B1 * | 5/2008 | Sandmann | F02D 41/221 73/114.45 |
| 7,409,822 B2 * | 8/2008 | Asanuma | F01N 3/0842 60/276 |
| 7,438,664 B2 * | 10/2008 | Saito | B60W 10/06 477/3 |
| 7,571,601 B2 | 8/2009 | Lee | |
| 7,624,568 B2 * | 12/2009 | Ando | B60K 6/445 180/65.1 |
| 7,849,672 B2 | 12/2010 | Shibata et al. | |
| 7,885,754 B2 | 2/2011 | Topinka et al. | |
| 7,892,363 B2 * | 2/2011 | Brooks | F02B 77/04 123/198 A |
| 7,996,147 B2 | 8/2011 | Gokhale | |
| 8,042,384 B2 | 10/2011 | Bailey | |
| 8,312,865 B2 | 11/2012 | Dixon et al. | |
| 8,315,779 B2 * | 11/2012 | Alark | F02D 41/221 123/435 |
| 8,333,336 B2 | 12/2012 | Lewis et al. | |
| 8,341,939 B2 | 1/2013 | Lee | |
| 8,478,510 B2 * | 7/2013 | Alark | F02D 41/221 123/479 |
| 9,157,385 B2 | 10/2015 | Gallagher et al. | |
| 2003/0205218 A1 * | 11/2003 | McIntyre | F02D 41/0025 123/494 |
| 2004/0139944 A1 * | 7/2004 | Nakano | F02D 19/0647 123/406.47 |
| 2004/0216714 A1 * | 11/2004 | Tayama | F02B 23/101 123/276 |
| 2006/0136113 A1 * | 6/2006 | Juranitch | F02D 37/00 701/104 |
| 2008/0115485 A1 | 5/2008 | Lee | |
| 2009/0063018 A1 * | 3/2009 | Takeuchi | F02D 41/1497 701/104 |
| 2009/0076707 A1 * | 3/2009 | Sugiyama | F02D 41/123 701/103 |
| 2010/0082222 A1 * | 4/2010 | Alark | F02D 41/221 701/103 |
| 2010/0122690 A1 * | 5/2010 | Miyake | F02D 41/3836 123/457 |
| 2010/0170474 A1 * | 7/2010 | Yamaguchi | F02D 31/008 123/339.12 |
| 2010/0294236 A1 * | 11/2010 | Surnilla | F02D 41/0025 123/304 |
| 2011/0202255 A1 | 8/2011 | Hauser | |
| 2014/0214307 A1 * | 7/2014 | Thompson | F02D 41/2467 701/105 |

OTHER PUBLICATIONS

Choi et al., "Comparison of the effects of multiple injection strategy on the emissions between moderate and heavy EGR rate conditions: part 2—post injections", Journal of Mechanical Science and Technology, vol. No. 27, Issue No. 1, pp. 2217-2223, Jul. 2013.

Non-Final Rejection towards related U.S. Appl. No. 15/087,247 dated Jun. 2, 2017.

\* cited by examiner

FUEL INJECTOR WEAR CORRECTION METHODOLOGY

BACKGROUND OF THE INVENTION

The present invention relates generally to fuel injectors and the wear of fuel injectors over time and more particularly to a fuel injector wear correction methodology.

As with many internal combustion engine components, fuel injectors are known to wear with use over time. This wear impacts the fuel injector's injection characteristics. In turn, effects on the engine using the worn fuel injector(s) are felt. With high pressure fuel injectors in particular, fuel can cavitate in the nozzle of the fuel injector causing uneven wear over time. This uneven wear can cause further cavitation in the nozzle. Cavitating fuel, ultimately, can act as a restriction on fuel flow, thereby resulting in reduced fuel flow through the fuel injector nozzle. This fuel injector performance degradation, in turn, ultimately affects engine performance and efficiency.

Accordingly, there is an ongoing need for both improving upon an understanding of these fuel injector wear characteristics and then also accounting for this improved understanding in the operation of engines and their fuel injector systems.

BRIEF DESCRIPTION

The present invention overcomes at least some of the aforementioned drawbacks by providing a fuel injector wear correction methodology that addresses the problem of efficiency drift over time (and/or the life) of a fuel injector caused by, amongst other items, nozzle wear. This invention, in turn, allows for improvement of engine efficiency over the life and wear of the fuel injector(s) therewith.

Therefore, in accordance with one aspect of the invention, a method comprises: determining one of: power of an internal combustion engine; and a fuel flow of at least one fuel injector associated with a cylinder of the internal combustion engine; obtaining a duration of a fuel injection event from the at least one fuel injector associated with the cylinder of the internal combustion engine; comparing at least one of: the power, the fuel flow, and the duration with a reference value; and adjusting fuel injection timing of the at least one fuel injector, based on the comparing.

According to another aspect of the present invention, a method of adjusting operation of an engine comprises: comparing a first engine model to a second engine model, wherein the first model is related to a fuel injection event duration of the engine or a modeled fuel quantity being supplied to the engine and the second model is another aspect related to the engine; and adjusting fuel injection timing of at least one fuel injector of the engine, based on the comparing.

Various other features and advantages of the present invention will be made apparent from the following detailed description and the drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art with respect to the presently disclosed subject matter. The terms "first", "second", and the like, as used herein do not denote any order, quantity, or importance, but rather are used to distinguish one element from another. The terms "a", "an", and "the" do not denote a limitation of quantity, but rather denote the presence of at least one of the referenced item, and the terms "front", "back", "bottom", and/or "top", unless otherwise noted, are used for convenience of description only, and are not limited to any one position or spatial orientation.

If ranges are disclosed, the endpoints of all ranges directed to the same component or property are inclusive and independently combinable (e.g., ranges of "up to about 25 wt. %," is inclusive of the endpoints and all intermediate values of the ranges of "about 5 wt. % to about 25 wt. %," etc.). The modified "about" used in connection with a quantity is inclusive of the stated value and has the meaning dictated by the context (e.g., includes the degree of error associated with measurement of the particular quantity). Accordingly, the value modified by the term "about" is not necessarily limited only to the precise value specified.

Aspects of the present invention have been shown to offer advantages over previous methodologies of injecting fuel in internal combustion engines. The methodologies can address the issue of significant efficiency drift over the life of a fuel injector, often caused by nozzle wear. These methodologies can also improve the engine efficiency and emissions over the life of the fuel injector(s).

Figure 1:
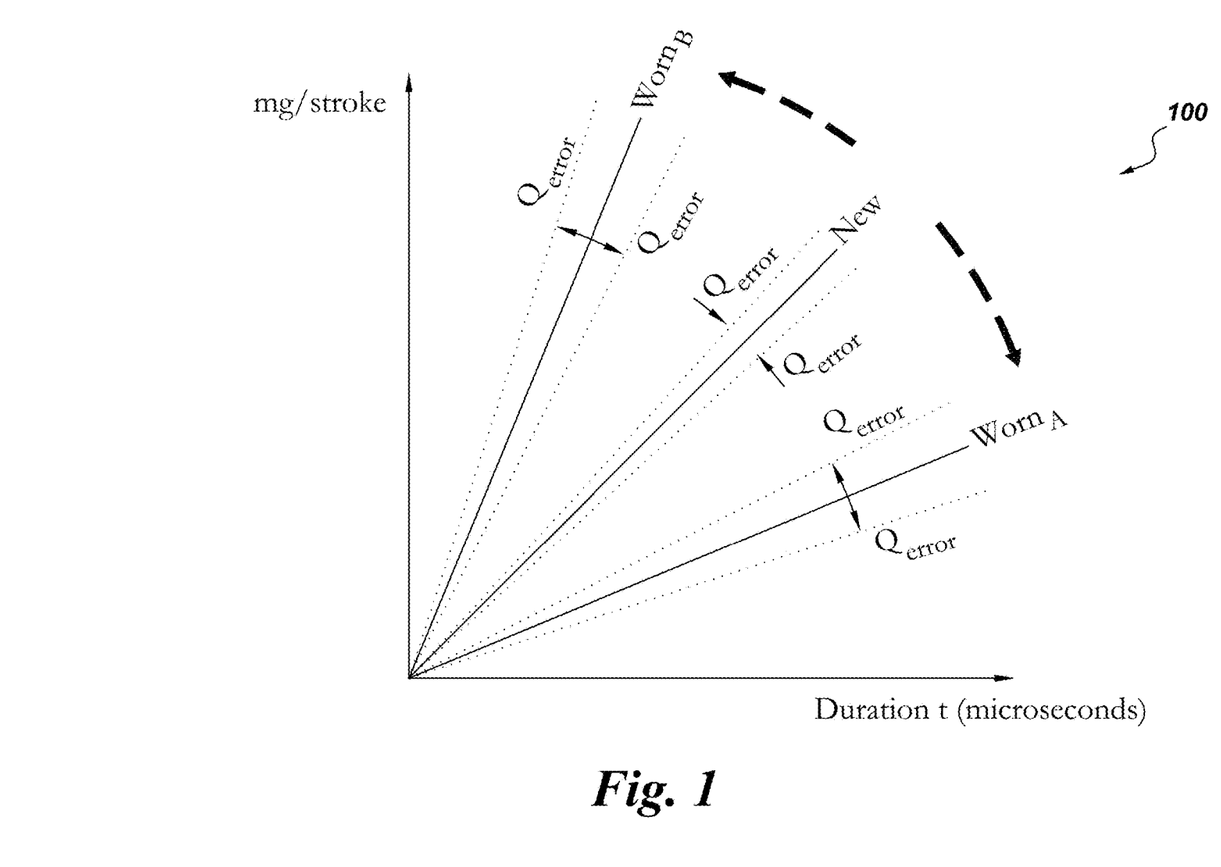
FIG. 1 is an x-y graph comparing fuel flow over time for exemplary new and worn fuel injectors.

Referring to FIG. 1, a graph depicting and comparing the flow, Q, over time, t, for various hypothetical fuel injectors is denoted as 100. As shown, the y axis, in units for fuel rate (e.g., mg/stroke), is compared to the x axis, in units of time (e.g., micro-seconds). The graph (not to scale) is illustrating fuel rates per stroke of various exemplary fuel injectors over time. As shown, a new fuel injector (labelled "New") has a certain specified fuel rate over time (depicted by the solid line). The dotted lines (labelled "$Q_{error}$"), on either side of the solid line, signify a scatter of the various actual fuel rates for a quantity of "n" injectors that may differ from the specified fuel rate due to, for example, production and manufacturing imperfections and the like. As the new fuel injector is used over time, the fuel injector becomes worn and performance of the fuel injector typically changes over time. As the two other graph lines (labelled "$Worn_B$" and "Worn$_A$") illustrate, worn fuel injector may have a greater or lesser fuel rate over time than the same new fuel injector model. For example, the Worn$_A$ injector experiences a reduced flow rate over time and wear (See e.g., FIGS. 2A and 2B). Contrastingly, the Worn$_B$ injector experiences an increased flow rate over time and wear (See e.g., FIGS. 3A and 3B). Similarly, the worn fuel injectors (e.g., Worn$_A$, Worn$_B$) may have a larger quantity of error in fuel rate than the new fuel injector's quantity of error.

Figure 2A:
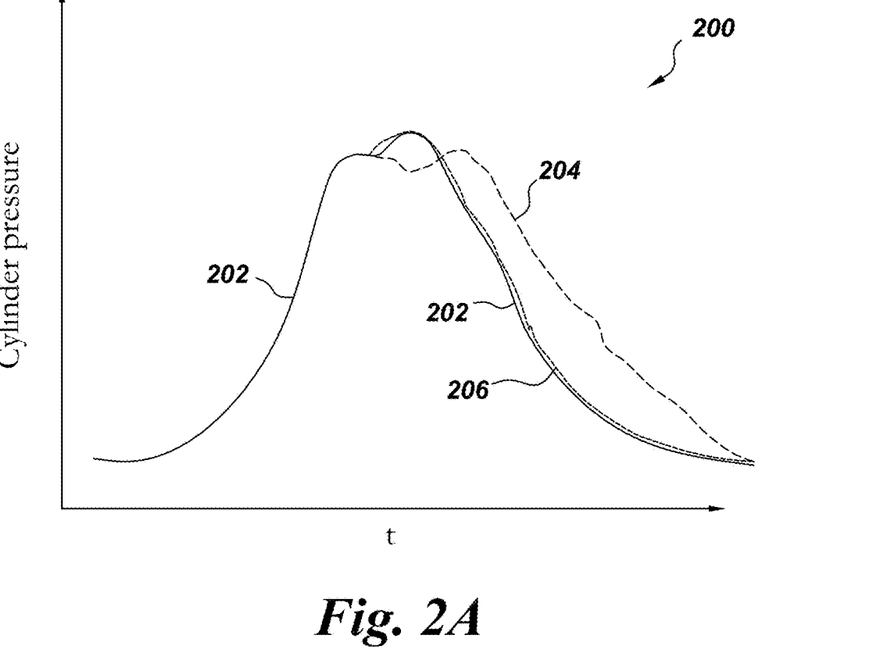
FIG. 2A is an x-y graph comparing cylinder pressure over time of a single power stroke for a fuel injector, according to embodiments of the present invention.
Figure 2B:
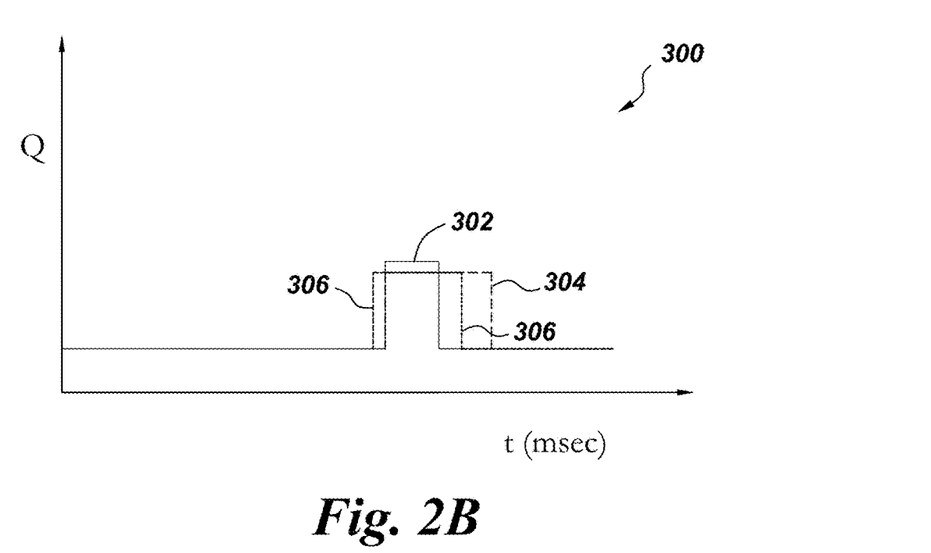
FIG. 2B is an x-y graph comparing the fuel flow of the fuel injector over the same single power stroke from FIG. 2A, according to embodiments of the present invention.

FIGS. 2A and 2B show cylinder activity for a hypothetical single power stroke (time) of fuel injector that after wear may have reduced flow (e.g., Worn$_A$). FIG. 2A shows the cylinder pressure over the single power stroke at 200. Comparatively FIG. 2B shows at 300 the fuel flow over time of a fuel injector over the same power stroke as that in FIG. 2A. More specifically FIG. 2A details typical cylinder pressures for a single power stroke for a cylinder having a new fuel injector at 202. Over time, as the fuel injector wears, the cylinder pressure suffers a time-lag (e.g., moves to right on x-axis) over time as depicted by dotted line 204. By using the instant methods, the cylinder pressure of the cylinder is moved back towards the left on the x-axis to counterbalance the effect of fuel injector wear, as denoted by 206. As the dashed line 206 depicts, the instant methods include adjusting the timing so that the resultant cylinder pressure for each power stroke more closely emulates that of the cylinder pressure in a cylinder having the new fuel injector 202.

FIG. 2B shows, not to scale, a typical fuel flow in a single cylinder over time for a single power stroke event (e.g., the power stroke event of FIG. 2A) for a fuel injector. At 302, a typical new fuel injector may inject fuel over a finite duration of time (e.g., 5000 μsec). Over use as discussed herein the fuel injector wears and its performance degrades. As a result, in order to achieve the same desired power output with the worn fuel injector as with the new injector, the associated engine controller(s) adjusts the duration of time of the injection event. As line 304 depicts, the overall time duration of the fuel injection event is lengthened such that it is longer in duration that the time duration for fuel injection event with the new injector (i.e., 302). For example, the new adjusted duration may be 5500 μseconds. When using the methods herein with the fuel injector system, the resultant fuel flow curve may appear as the line depicted at 306. That is, as 306 shows, the methods herein will adjust the timing by moving the start time of the fuel injection event earlier than the start of the fuel injection event for the new injector 302. The methods may also adjust the timing by moving the finish time of the time injection event 306 earlier than the finish time of the time injection event 304. In this manner, the power generated from the cylinder's power stroke with the worn fuel injector will closely match the power derived from the cylinder with the new fuel injector and the end time of the injection event with the worn injector will more closely match the end time of the injection event as that with the new injector.

As an alternative to the scenario in FIGS. 2A and 2B, the injection duration may be held constant in some cases. For this case, the fuel quantity supplied will vary as the injector wears. If the wear is such that the fuel quantity decreases, then the engine power output will suffer, resulting in a negative impact on performance with possible effects on emissions. If the wear is such that the fuel quantity increases, then the engine may operate at too high a power level, resulting excessive stress in the mechanical components which may impact reliability, as well as potential negative impacts on emissions.

Figure 3A:
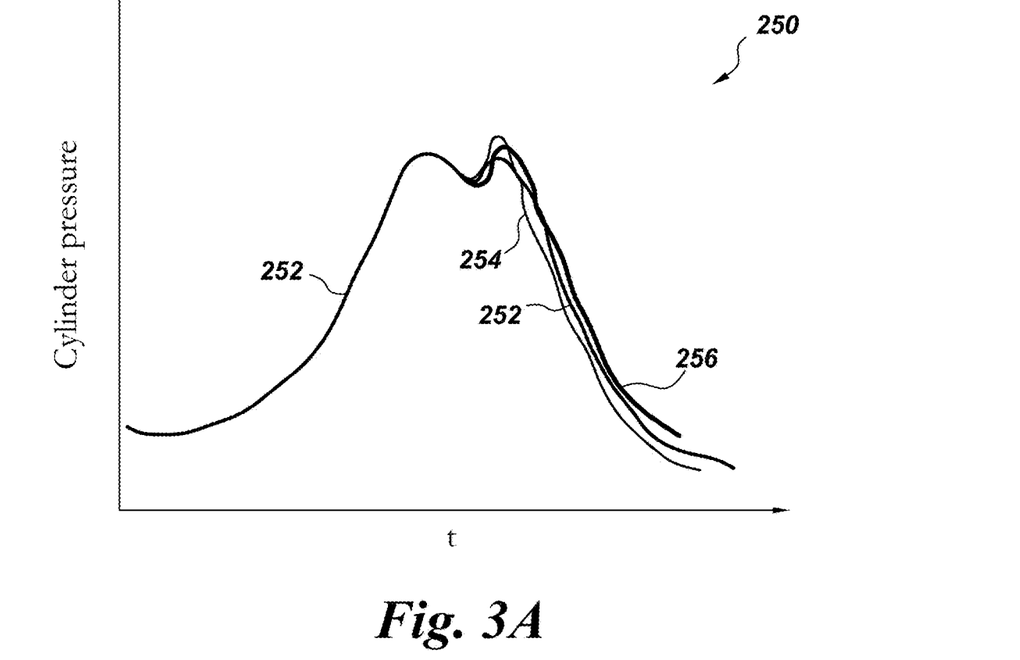
FIG. 3A is an x-y graph comparing cylinder pressure over time of a single power stroke for a fuel injector, according to other embodiments of the present invention.
Figure 3B:
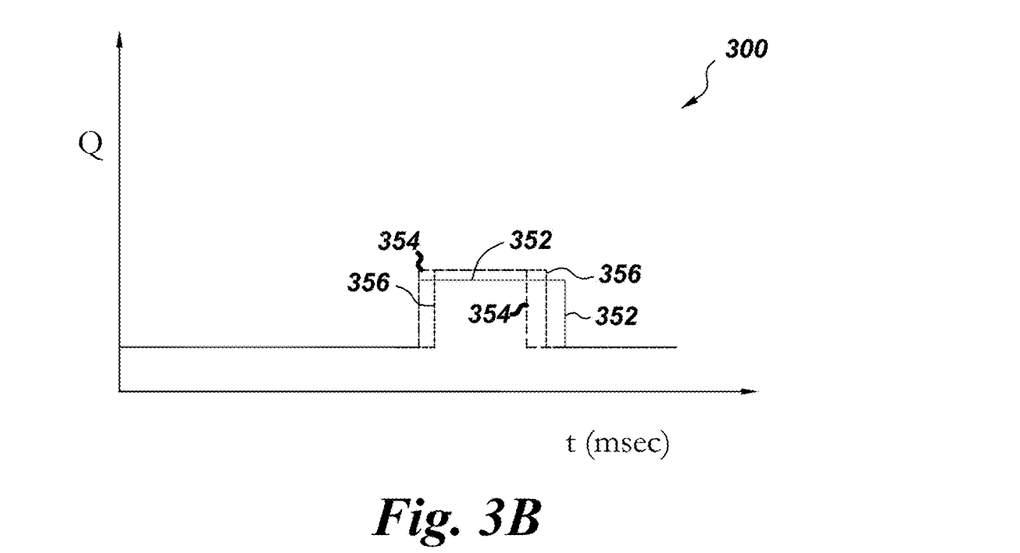
FIG. 3B is an x-y graph comparing the fuel flow of the fuel injector over the same single power stroke from FIG. 3A, according to embodiments of the present invention.

FIGS. 3A and 3B show cylinder activity for a hypothetical single power stroke (time) of fuel injector that after wear may have increased flow (e.g., Worn$_B$). FIG. 3A shows the cylinder pressure over the single power stroke at 250. Comparatively FIG. 3B shows at 300 the fuel flow over time of a fuel injector over the same power stroke as that in FIG. 3A. More specifically FIG. 3A details typical cylinder pressures for a single power stroke for a cylinder having a new fuel injector at 252. Over time, as the fuel injector wears and flow increases, the cylinder pressure increase starts earlier (e.g., moves to left on x-axis) over time as depicted by dotted line 254. By using the instant methods, the cylinder pressure of the cylinder is moved back towards the right on the x-axis to counterbalance the effect of fuel injector wear, as denoted by 256. As the solid bold line 256 depicts, the instant methods include adjusting the timing so that the resultant cylinder pressure for each power stroke more closely emulates that of the cylinder pressure in a cylinder having the new fuel injector 252.

FIG. 3B shows, not to scale, a typical fuel flow in a single cylinder over time for a single power stroke event (e.g., the power stroke event of FIG. 3A) for a fuel injector. At 352, a typical new fuel injector may inject fuel over a finite duration of time (e.g., 5000 μsec). Over use as discussed herein the fuel injector wears and its performance degrades. As a result, in order to achieve the same desired power output with the worn fuel injector as with the new injector, the associated engine controller(s) adjusts the duration of time of the injection event. As line 354 depicts, the overall time duration of the fuel injection event is shortened such that it is shorter in duration that the time duration for fuel injection event with the new injector (i.e., 352). For example, the new adjusted duration may be 5500 μseconds. When using the methods herein with the fuel injector system, the resultant fuel flow curve may appear as the line depicted at 356. That is, as 356 shows, the methods herein will adjust the timing by moving the start time of the fuel injection event later than the start of the fuel injection event for the new injector 352 and/or the start time for the adjusted fuel injection 354. The methods may also adjust the timing by moving the finish time of the time injection event 356 later than the finish time of the adjusted time injection event 354. In this manner, the power generated from the cylinder's power stroke with the worn fuel injector will closely match the power derived from the cylinder with the new fuel injector and the end time of the injection event with the worn injector will more closely match the end time of the injection event as that with the new injector.

Figure 4:
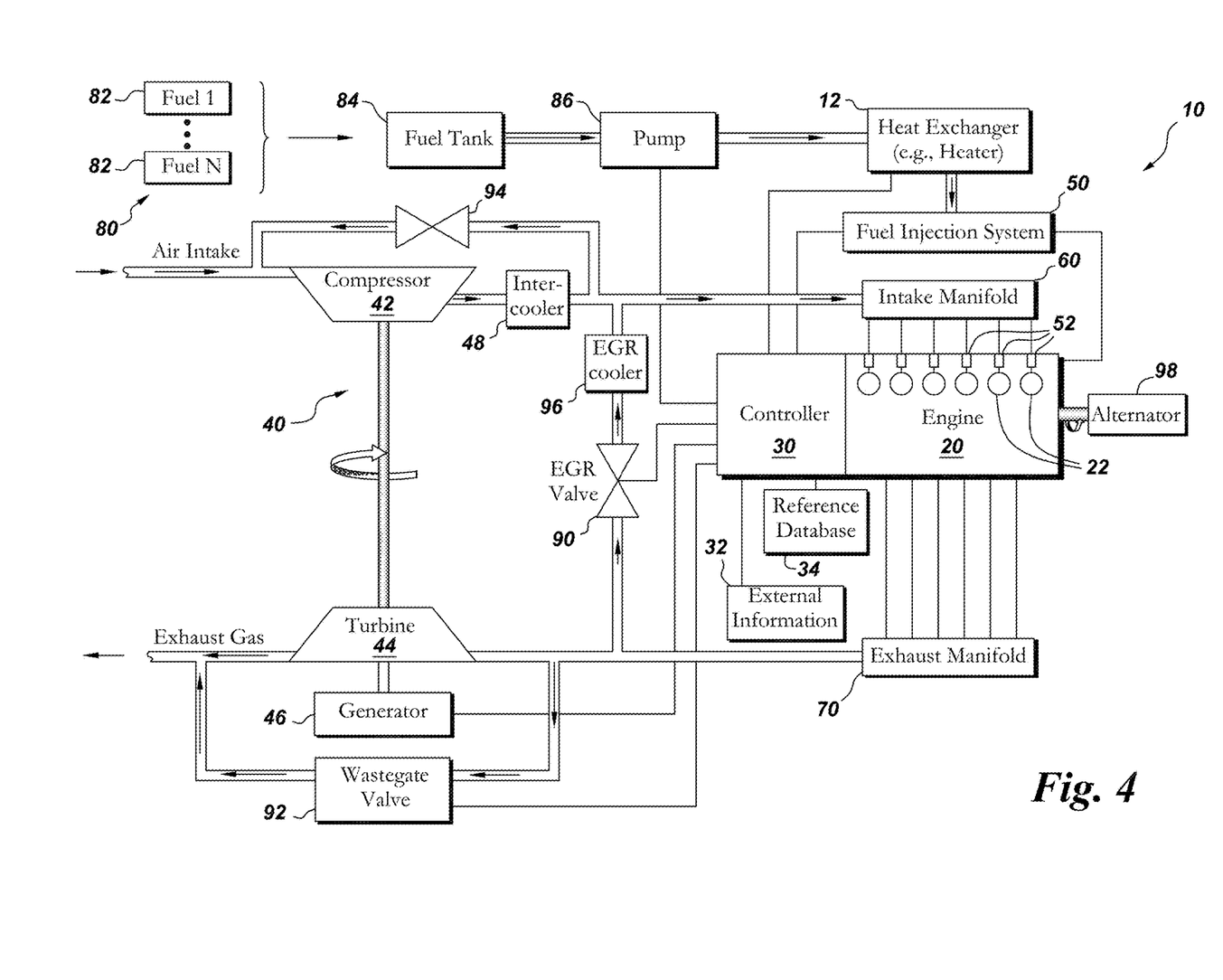
FIG. 4 is a schematic diagram of an engine system that employs aspects of the present invention.

Referring to FIG. 4, a schematic diagram of one embodiment of an engine system 10 that can use the various methods disclosed herein is shown. The engine system 10 may comprise the engine 20 proper having one or more cylinders 22 having one or more fuel injectors 52 associated with each cylinder 22. The engine has one or more controller(s) 30 associated therewith. Each cylinder 22 may have one or more fuel injector(s) 52 associated therewith. The fuel injector(s) 52 are associated with a fuel injection system 50.

Further associated with the engine 20 may be an intake manifold 60 and an exhaust manifold 70. As shown, the engine system 10 includes a turbocharger 40 comprising an intercooler 48, a compressor 42 and turbine 44 and a rotatable shaft therebetween.

Other aspects of the engine system 10 may include a fuel tank 84, pump 86, and heat exchanger 12. The fuel tank(s) 84 may comprise a plurality of fuels 80, including from a "fuel 1" 82 up to a "fuel N" 82. In this manner, the engine 20 may be configured to operate on a plurality of fuels 80.

The engine system 10 may comprise an EGR system comprising a bypass line, EGR cooler 96, and EGR valve 90. The engine system 10 may comprise a compressor bypass line and compressor bypass valve 94 in the air intake line. The engine system 10 may comprise a generator 46 operatively attached to the turbine 44 and an alternator/generator 98 operatively attached to a rotating shaft (e.g., crankshaft) of the engine 20. The engine system 10 may comprise a waste gate valve 92 and bypass line in the exhaust gas line.

It should be apparent that a variety of configurations of engine system 10 are possible in addition to the embodiment shown in FIG. 4. Similarly, various known operational aspects and methods of the engine system 10 are not repeated here for clarity purposes only.

As shown, the controller 30 is operatively attached to several elements of the engine system 10 including the fuel injection system 50 and a reference database 34 and external information 32. External information 32 may include, for example, information related to air temperature, oil temperature, altitude information, and/or atmospheric pressure. The reference database 34 may include information related to the engine system 10 including, for example, a compressor map, a volumetric efficiency model, a predetermined injection timing map, and/or various engine models.

Figure 5:
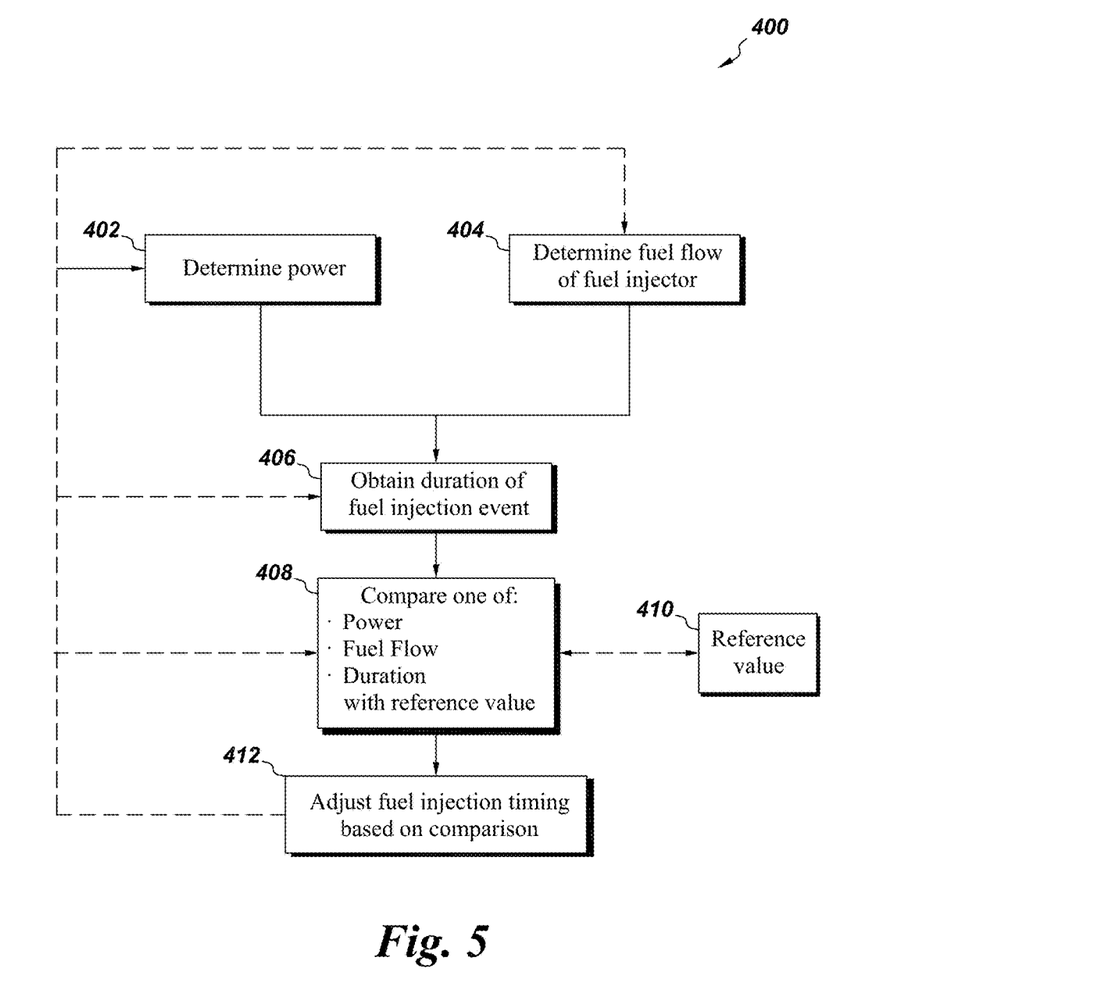
FIG. 5 is a flowchart of a method of use according to an embodiment of the present invention.

Referring to FIG. 4 and FIG. 5 collectively, a method 400 may comprise determining one, or both, of the power output 402 of an internal combustion engine and the fuel flow of one, or more, fuel injector(s) of the engine 404. The method 400 includes obtaining a duration of the fuel injection event for a fuel injector associated with a cylinder of the engine 406. The method 400 then compares at least one of the power, fuel flow, and/or duration 408 to a reference value 410. Based on the comparison 408, the method 400 may then adjust the fuel injection timing of one, or more, fuel injectors 412 so as to compensate for the change of power, fuel flow and/or injection duration, which can all be indicators in loss of fuel injector flow performance.

Power output of the engine can be obtained by a variety of means. Measuring a rate of change of the revolutions per minute (rpm) of the engine can lead to obtaining power output. Determining the power the engine is generating can comprise receiving an electrical power signal from one, or more, engine loading components associated with the engine. By example, and not limitation, the engine load component may be the alternator.

In one embodiment, torque (and, thus, power) can be determined by using a rigid body rotational model and friction model, while operating the engine when completely unloaded. For example, the engine could be run at idle (e.g., 300 rpm) or as low an engine speed that the generator generates just enough electricity to operates (c. 1-2 kwatts). Then the field to the alternator is turned off. The duration of the fuel injection event is set to a predetermined value. The rate of acceleration of the engine (in rpm per second) is then measured.

The fuel flow for the fuel injector(s) can be determined by a variety of means. The fuel flow may be determined for only one injector or a plurality of fuel injectors with the internal combustion engine and then averaged.

In an embodiment determining the fuel flow may comprise determining the the air-fuel ratio and determining air flow and then calculating the fuel flow. The air-fuel ratio can be determined by taking the oxygen measurement in the exhaust flow from any $O_2$ sensor(s), typically located in an exhaust system of an engine. Air flow can be determined, in the case of turbocharged engine, by estimating air through any compressor(s) by using a compressor map. Air flow can also be determined by using a volumetric efficiency model for the engine assembly, which is a function that evaluates air flow as a function of various parameters including, but not limited to, one or more of intake air pressure, intake air temperature, and engine speed.

In embodiments where the engine includes an exhaust gas recirculation (EGR) system, this method may be used by either turning EGR off prior to the air flow calculation, discussed herein, or the EGR value can be corrected for mathematically. In either event, once air flow is calculated, air flow can be divided by the air-fuel ratio, to determine fuel flow.

The obtaining of the duration of the fuel injection event for a fuel injector may include receiving measurements of the time duration (typically in microseconds) for one or more fuel injectors associated with the engine to dispense fuel in each injection event. The duration may be obtained by a variety of means. Several engines currently have means for sending a commanded duration to the fuel injector(s). In an embodiment, obtaining the duration comprises obtaining the commanded duration of the fuel injection event. Other means of obtaining the duration of fuel injection includes measuring mechanically and/or electrically the duration of the fuel injecting event.

Comparing of the power, fuel flow, and/or duration to a reference value may comprise comparing one or more of the values to a pre-determined value (i.e., reference value). The reference value may be certain specified values for the engine having new fuel injectors. Alternatively, the reference value may be, for example, earlier obtained values. In this manner, the adjusting of fuel injection timing can be based on comparing the earlier values and then made, for example, if the change or rate of change of one or more of the values exceeds a predetermined value. The comparing may be activated by one or more of a fixed event, a fixed time duration, continually repeating, and/or upon user demand. For example, the fixed event may be at periodic maintenance event. For example, the fixed time duration may be weekly, monthly, semi-annually or after a certain hours of operation, and the like.

Adjusting the fuel injection timing may comprise moving a start of the fuel injection event earlier for the case where the injector flow has been found to be lower than the reference, or later for the case where the injector flow has be found to be higher than the reference. The adjusting may further comprise correcting a predetermined injection timing affiliated with the internal combustion engine. Additionally, the EGR rate (if applicable) may be adjusted based on the comparing. In another embodiment, one or more additional components of the engine may be adjusted including, but not limited to, a compressor bypass valve, an exhaust waste gate vale, an engine bypass valve, a turbine bypass valve, a variable geometry turbine, a variable valve timing device, and the like.

One or more of these prior steps (e.g., determining power, determining fuel flow, obtaining duration) may be repeated. The repeating can be once, a plurality of times, or a continual repetition, or some combination thereof. After repeating, the power, fuel flow, and/or injection duration may be compared to values before the repeating, or to values earlier in the repeating process. As a result of the comparison, the method adjusts the fuel injection timing. The adjustment may include moving the start time of the fuel injection event earlier. The adjustment may further include moving the finish time of the fuel injection event earlier.

Thus, the overall duration of the fuel injection event may be longer than the original duration, when the fuel injector is new and unworn.

The repeating may be activated by one or more of a fixed event, a fixed time duration, continually, and/or at user demand. For example, at a certain fixed calendar date the repeating may take place. Similarly, the repeating may be done on a recurring basis (e.g., every XX minutes, YY days, every ZZ hours of engine operation, every TT miles of vehicle travel, etc.). The repeating may be electively done by an engine operator or any remote entity in communication with the engine.

The comparison of power, fuel flow, and/or duration values from after the repeating can be made against power, fuel flow, and/or duration at any earlier time/values for the engine. For example, the comparison could be made to the original power, fuel flow, and duration values obtained when the fuel injector(s) is (are) installed as new. In another example, the comparison could be made to values (e.g., power, fuel flow, duration) that were obtained in an earlier comparison step and not to the original values. In making the adjustment in fuel injection timing, based on the comparison, the adjustment can be made and triggered when certain threshold values are reached in making the comparison (e.g., percentage change, rate of change, absolute value). For example, and not by limitation, the fuel injection timing could be adjusted when the power of the engine has dropped by more than 2%. In another example, the timing could be adjusted when the fuel flow is reduced below XX mg/stroke.

Figure 6:
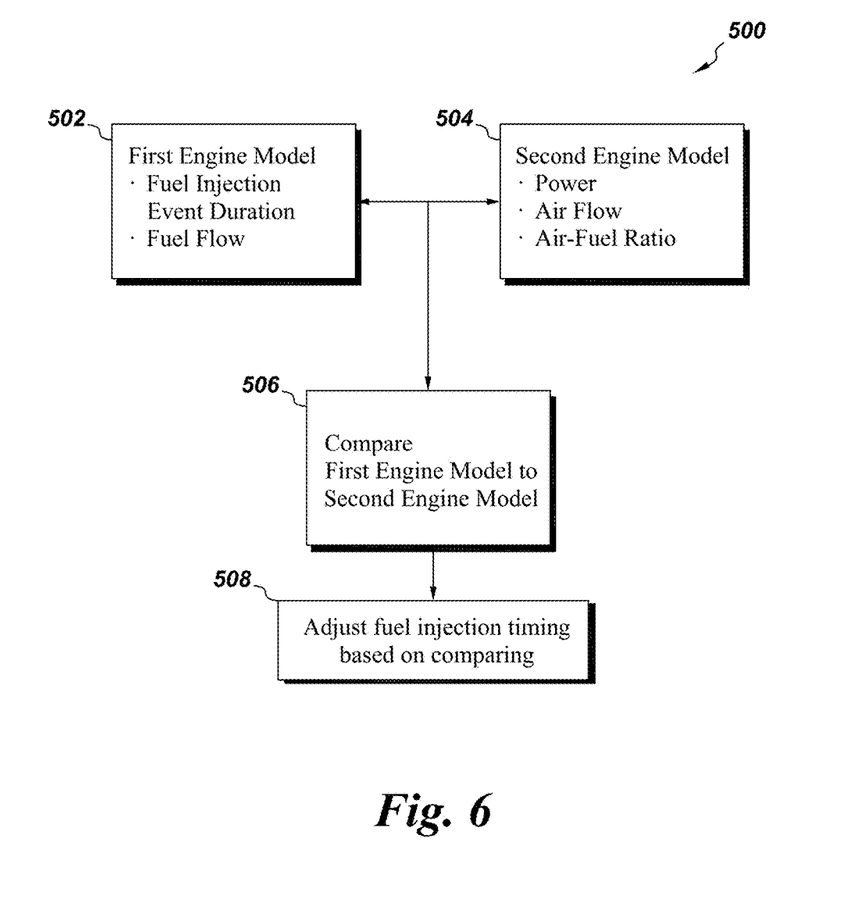
FIG. 6 is a flowchart of a method of use according to another embodiment of the present invention.

Referring to FIG. 6, another method is depicted as a flowchart 500. The method 500, which causes adjustment in the operation of an engine, comprises comparing at least two engine models 506 (e.g., a first engine model 502 and a second engine model 504) and then adjusting the fuel injection timing of at least one fuel injector of the engine, based on the comparing 508. The first engine model 502 is related to a fuel injection event duration of the engine or a modeled fuel quantity being supplied to the engine. The second, or other, model 504 is based on any other aspect(s) of, or related to, the engine.

The term engine model means an implementation that quantifies at least one aspect of the engine through one or more of direct measurement, indirect measurement, derivation, simulation and/or virtualization of one or more aspects of the engine.

The first engine model 502, which is related to the duration of fuel injection event, may be based on a predetermined fuel injector map including details of expected fuel quantity as a function of operating conditions such as injection duration and fuel injection pressure and the like. Alternatively, the first model 502 may be based on a response factor of the engine such as measuring the rate of change of the engine RPM for a commanded load demand and injection command. The load demand may further constitute a condition where little or no torque is being applied to the engine. Other models to determine fuel quantity may include, but are not limited to, one or more of: a model of vehicle, a system or sub-system response to an increase in commanded fueling, a model of system, sub-system or component response while disabling one or more fuel injectors. The systems may include, but are not limited to, the fuel system, the air handling system, the lubrication system, the cooling system and the electrical system. Sub-systems may include but are not limited to the turbocharger subsystem, the power-assembly sub-system and the after-treatment subsystem.

In the embodiment of an engine with more than one fuel supply (e.g., a dual fuel engine), multiple fuel injector maps may be used in conjunction to evaluate the performance of the fuel injectors for each fuel. This evaluation may be performed at multiple operating conditions so that the wear of each injector type may be corrected for. One non-limiting exemplary case is that of a dual fuel engine where one fuel is disabled completely and hence the engine operates in a single-fuel mode. In another non-limiting example, the dual fuel engine may operate at two distinct combinations of the two fuels in order to evaluate the individual characteristics of each fuel injector type.

The second, or other, engine model 504 may be based on one or more aspects of the engine including actual measured fuel flow rate, power or the combination of air flow and the air-fuel ratio of the engine. In turn, the air flow may be derived in one or more ways. For example, the air flow may be based on a compressor map or volumetric efficiency. In another example, the air flow is measured directly. In another embodiment, the air flow is based on exhaust gas recirculation (EGR) valve positions and volumetric efficiency. Likewise the power can be derived by one of several means as described herein.

The second model 504 may be based on power. The power may comprise a summation of measured power plus losses and transient power. In this manner, a total power can be derived. Once total power is found, total power can be divided by fuel efficiency to arrive at a calculated fuel flow rate.

With any of these methods, or combination of methods, the method can be conducted in a variety of ways. The method(s) may continually be repeated. Alternatively, the method(s) may be executed when a new fuel injector(s) is first installed, so as to determine a "baseline" fuel injection event duration for future comparison. Still alternatively, the method(s) may be repeated intermittently and automatically based on fixed events. For example, and not by limitation, the method(s) could be repeated after a fixed duration (e.g., every X hours of operation, every Y months) or event (e.g., after X miles of travel by the vehicle having the engine, after certain maintenance events) or after a predetermined quantity of fuel injection events. Alternatively, the method(s) can be repeated by user election.

Any of the methodologies may optionally also use additional information to further improve the accuracy of the calculation(s). For example, corrections for various operating conditions can also be factored in. Operating conditions that can be used in this factoring include, but are not limited to, air temperature, atmospheric pressure, altitude, oil temperature, and the like.

The methodologies may be used for virtually any internal combustion engine that uses one or more fuel injectors. Fuel injectors operating at high fuel pressures (e.g., above about 2000 bar) have been found to benefit from the methodologies.

The methodologies may also be used with internal combustion engines that use one or more than one fuel type. For example, and not by limitation, the methods can be used on a duel fuel engine such as an internal combustion engine that operates on diesel and natural gas. Other fuels besides diesel and natural gas include ethanol, gasoline, methanol, and the like.

While the embodiments illustrated and described herein may be used with a vehicle having an internal combustion engine, in turn, having one or more fuel injectors, other systems may employ aspects of the present invention without departing from the scope of the invention. For example, the internal combustion engine may be stationary or on a vehicle. Similarly, the engine may have multiple fuel delivery systems besides only having one or more fuel injectors, and the like. In an embodiment, the fuel injectors need not be injecting directly into the combustion chamber. In still other embodiments, other devices or engines other than only internal combustion engines yet that still use fuel injection means can also gain advantage with the inventions herein.

Therefore, according to one embodiment of the present invention, a method comprises: determining one of: power of an internal combustion engine and a fuel flow of at least one fuel injector associated with a cylinder of the internal combustion engine; obtaining a duration of a fuel injection event from the at least one fuel injector associated with the cylinder of the internal combustion engine; comparing at least one of: the power, the fuel flow, and the duration with a reference value; and adjusting fuel injection timing of the at least one fuel injector, based on the comparing.

According to another embodiment of the present invention, a method of adjusting operation of an engine comprises: comparing a first engine model to a second engine model, wherein the first model is related to a fuel injection event duration of the engine or a modeled fuel quantity being supplied to the engine and the second model is another aspect related to the engine; and adjusting fuel injection timing of at least one fuel injector of the engine, based on the comparing.

While only certain features of the invention have been illustrated and/or described herein, many modifications and changes will occur to those skilled in the art. Although individual embodiments are discussed, the present invention covers all combination of all of those embodiments. It is understood that the appended claims are intended to cover all such modification and changes as fall within the intent of the invention.

What is claimed is:

1. A method comprising:
   determining one of: a power of an internal combustion engine, a fuel flow of at least one fuel injector associated with a cylinder of the internal combustion engine, and a duration of a fuel injection event from the at least one fuel injector associated with the cylinder of the internal combustion engine;
   comparing at least one of: the power, the fuel flow, and the duration with a corresponding reference value; and
   adjusting fuel injection timing of the at least one fuel injector, based on the comparing to compensate for a loss in flow performance of the at least one fuel injector, wherein the adjusting fuel injection timing of the at least one fuel injector comprises making and triggering an adjustment in the fuel injection timing when a threshold value corresponding to the at least one of: the power, the fuel flow, and the duration is reached in making the comparison.

2. The method of claim 1, wherein the reference value represents a value corresponding to a new injector; and
   wherein comparing comprises comparing after the at least one fuel injector is used over time and thereby it is a worn injector.

3. The method of claim 1, wherein the adjusting comprises moving a start time of the fuel injection event corresponding to a worn injector earlier than a start time of the fuel injection event corresponding to a new injector.

4. The method of claim 1, wherein determining the power comprises measuring a rate of change of revolutions per minute (rpm) of the internal combustion engine.

5. The method of claim 1, wherein determining the power comprises receiving an electrical power signal from at least one electrical loading component associated with the internal combustion engine.

6. The method of claim 1, wherein obtaining the duration comprises at least one of: obtaining the duration of the fuel injection event as commanded to the fuel injector, measuring the duration mechanically, and measuring the duration electrically.

7. The method of claim 1, wherein determining the fuel flow comprises:
   determining an air/fuel ratio;
   determining an air flow; and
   calculating the fuel flow by dividing the air flow by the air/fuel ratio.

8. The method of claim 7, wherein determining the air flow comprises determining the air flow with a compressor map.

9. The method of claim 7, wherein determining the air flow comprises using a volumetric efficiency model of the internal combustion engine.

10. The method of claim 1, further comprising adjusting an exhaust gas recirculation (EGR) rate of the internal combustion engine, based on the comparing.

11. The method of claim 1, further comprising, based on the comparing, adjusting at least one of: a compressor bypass valve, an exhaust waste gate valve, an engine bypass valve, a turbine bypass valve, a variable geometry turbine, and a variable valve timing device.

12. The method of claim 2, wherein comparing is activated by one of: a fixed event, a fixed time duration, automatically, and a user demand.

13. The method of claim 1, wherein comparing is activated by one of: a fixed event, a fixed time duration, automatically, and a user demand.

14. The method of claim 1, wherein determining the power comprises measuring torque of the internal combustion engine.

15. The method of claim 5, wherein the electrical loading component comprises an alternator.

16. The method of claim 1, wherein adjusting comprises correcting a predetermined injection timing map affiliated with the internal combustion engine.

17. The method of claim 1, where adjusting is further based on at at least one of air temperature, oil temperature, altitude, and atmospheric pressure.

18. The method of claim 1, further comprising repeating at least one of the comparing and adjusting over one of: a predetermined time duration and a predetermined quantity of fuel injection events.

19. A method of adjusting operation of an engine comprising:
   comparing a first engine model to a second engine model, wherein the first model is related to a fuel injection event duration of the engine or a modeled fuel quantity being supplied to the engine and the second model is related to one or more aspect related to the engine; and
   adjusting fuel injection timing of at least one fuel injector of the engine, based on the comparing to compensate for a loss in flow performance of the at least one fuel injector, wherein the adjusting fuel injection timing of the at least one fuel injector comprises making and triggering an adjustment in the fuel injection timing when a threshold value corresponding to the at least one of; the power, the fuel flow, and the duration is reached in making the comparison.

20. The method of claim 19, wherein the one or more aspect related to the engine comprises power of the engine.

21. The method of claim 19, wherein the one or more aspect related to the engine comprises air flow and an air-fuel ratio of the engine.

22. The method of claim 21, wherein the air flow is based on a compressor map.

23. The method of claim 21, wherein the air flow is measured directly.

24. The method of claim 21, wherein the air flow is based on volumetric efficiency.

25. The method of claim 21, wherein the air flow is based exhaust gas recirculation (EGR) valve positions and volumetric efficiency.

26. The method of claim 19, wherein the first engine model is based on fuel flow.

27. The method of claim 20, wherein the power comprises a summation of: measured power, power losses, and transient power.

28. The method of claim 19, wherein the engine comprises an internal combustion engine.

* * * * *